United States Patent [19]

Rettig

[11] Patent Number: 4,779,471
[45] Date of Patent: Oct. 25, 1988

[54] FLEXIBLE DRIVE ARRANGEMENT FOR AN IMPLEMENT

[75] Inventor: Vernon E. Rettig, Bondurant, Iowa

[73] Assignee: Deere & Company, Moline, Ill.

[21] Appl. No.: 30,762

[22] Filed: Mar. 26, 1987

[51] Int. Cl.[4] .............................................. A01B 33/14
[52] U.S. Cl. ........................................ 74/13; 111/36; 111/83; 172/105
[58] Field of Search ................. 74/13, 14; 111/36, 83; 172/105

[56] References Cited

U.S. PATENT DOCUMENTS

| | | | |
|---|---|---|---|
| 718,664 | 1/1903 | Shearer | 111/61 |
| 1,118,932 | 12/1914 | Heylman | 111/36 |
| 1,242,660 | 9/1917 | Dodge | 464/53 |
| 1,620,594 | 3/1927 | Christensen et al. | 172/105 |
| 1,726,386 | 8/1929 | Dalager | 74/13 |
| 2,184,488 | 12/1939 | Conwell | 74/13 |
| 2,725,006 | 11/1955 | Richmond | 172/105 |
| 2,801,833 | 8/1957 | Huge | 74/13 |

Primary Examiner—Lawrence Staab
Assistant Examiner—Scott Anchell

[57] ABSTRACT

A compact drive assembly including a flexible drive for transmitting power from a ground engaging wheel or wheels to a driven mechanism such as a seed meter on an implement. A set of cross helical spur gears are mounted in an enclosed case. The input gear is clamped to the ground engaging wheel shaft, and the output gear is fastened to a shaft which drives a flexible cable. The flexible cable is enclosed in a flexible housing and is connected to the remainder of the drive train.

9 Claims, 3 Drawing Sheets

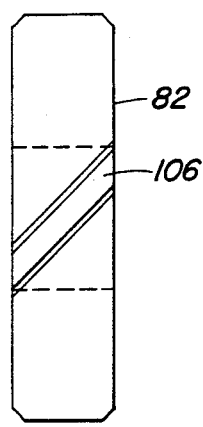
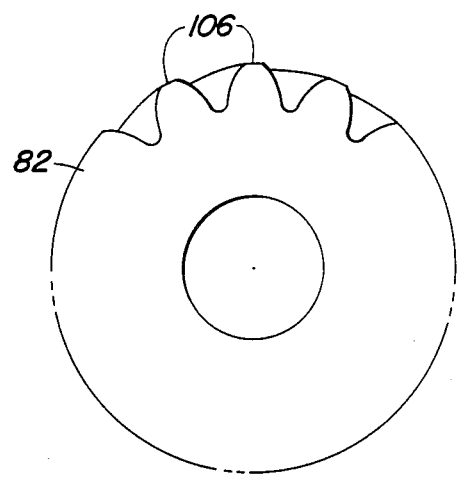
FIG. 5          FIG. 4
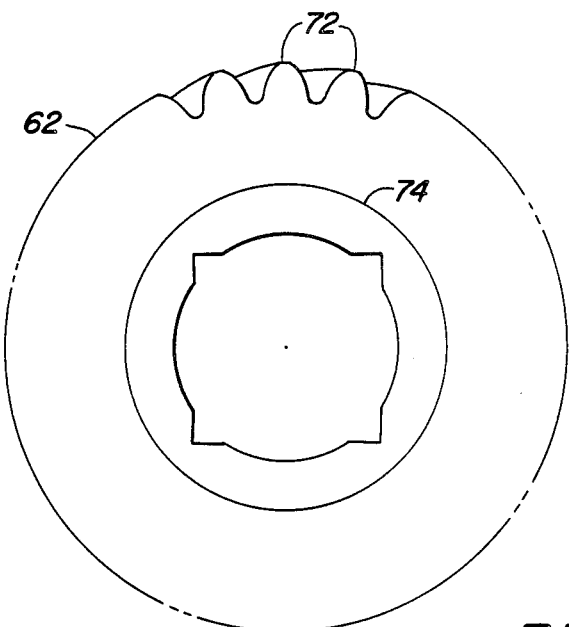
FIG. 6

FLEXIBLE DRIVE ARRANGEMENT FOR AN IMPLEMENT

BACKGROUND OF THE INVENTION

The present invention relates generally to drive systems on agricultural implements, and more specifically, to drive assemblies for powering pickup and feed mechanisms from ground engaging wheels.

Many farm implements utilize chain and sprocket drives from ground engaging wheels to power various pickup or feed mechanisms. Many times these drives are a source of trouble since the chain is subject to fouling by dirt, mud, rocks and weeds. The sprockets can build up with dirt and cause the chain to fail to release from the sprocket. Space is often limited around the drive wheel and around the implement frame, making routing of the chain very difficult. Also, access to the chain and sprockets is hindered making adjustments time-consuming and difficult. When needed adjustments are not made, failure of the chain drive is commonplace. In many applications, the position and angle of the drive axle shaft may vary with respect to the rest of the drive making alignment and adjustments in slack continuing problems. Such problems occur frequently, for example, in press wheel grain drills which utilize the press wheels to drive the seed and/or fertilizer metering mechanisms. The chain and drive sprockets of such a grain drill are situated such that dirt and other debris subject the drive to wear and dirt buildup which lead to premature failure. The press wheels are often narrowly spaced and access to the chain and sprockets is limited so that maintenance is often neglected. The press wheel gangs are pivotally connected to the drill frame to accommodate surface variations and obstacles, and therefore the position and angle of the drive axle can vary considerably during field operations.

BRIEF SUMMARY OF THE INVENTION

It is therefore an object of the present invention to provide an improved drive assembly for powering a mechanism from a ground engaging wheel. It is a further object to provide such an assembly which is more reliable and maintenance free than at least most of the previously available drive assemblies. It is still another object to provide such an assembly which is more compact and easily utilized where space is limited. It is another object to provide such an assembly which is more flexible than conventional drive assemblies and which is protected against dirt and other environmental elements.

It is yet another object of the present invention to provide an improved drive assembly for powering feed mechanisms from the press wheels of an implement such as a grain drill. It is a further object to provide such an assembly which is easy to mount and relatively unaffected by changes in position and angle of the press wheel assembly from which it is driven. It is another object to provide such a drive assembly which is compact and can be placed farther above the ground away from rocks and trash and the like.

The present invention utilizes a set of cross helical spur gears mounted in an enclosed case. The input gear is clamped to the ground engaging wheel shaft and the output gear is fastened to a shaft which drives a flexible cable. The flexible cable is enclosed in a flexible housing and is connected to a conventional transmission arrangement or the like for driving a mechanism such as a seed meter on the implement. The drive is sealed against dirt, mud and other environmental elements for increased reliability over drives which are more open. The cross helical drive arrangement permits the output shaft to be placed high above the ground away from interference with rocks and trash. The gears have relatively large teeth and can be enclosed in a narrow compact case for placement where space is limited, such as between narrowly spaced press wheels of a grain drill. The cross helical gears do not require precise alignment, such as is necessary with bevel gear arrangements, and the drive assembly is almost maintenance free and substantially more reliable than chain drives.

These and other objects, features and advantages of the present invention will become apparent to those skilled in the art from the description which follows and from the drawings.

BRIEF DESCRIPTION OF THE DRAWINGS

FIG. 4 is a side view of the output cross helical gear.

FIG. 5 is an end view of the gear of FIG. 4.

FIG. 6 is an end view of the input cross helical gear which is clamped to the drive shaft of FIGS. 2 and 3.

DESCRIPTION OF THE PREFERRED EMBODIMENT

Figure 1:
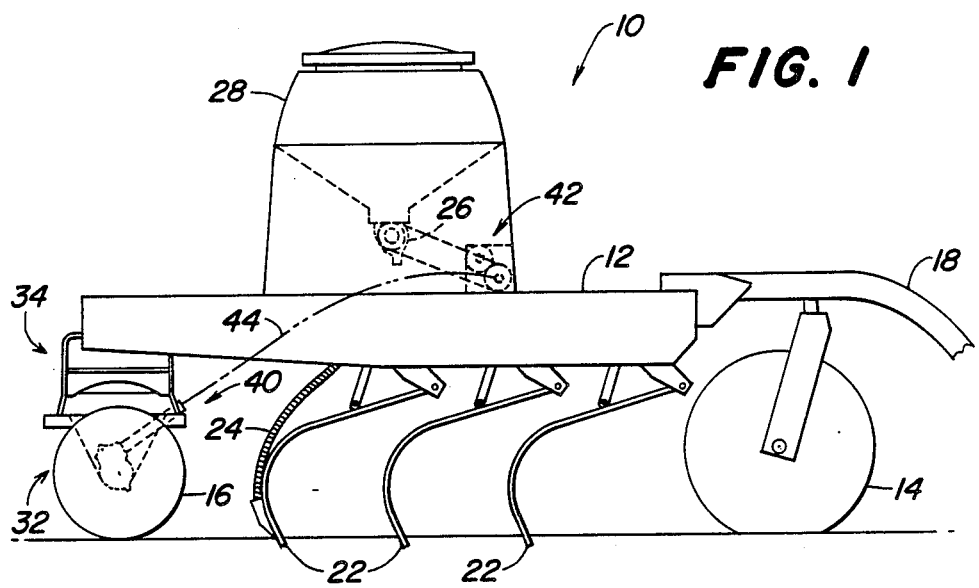
FIG. 1 is a side view of a press wheel grain drill with the drive assembly of the present invention attached thereto.
Figure 2:
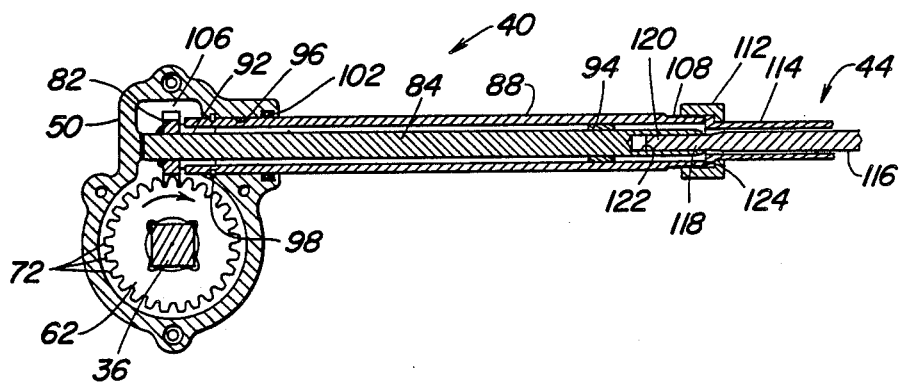
FIG. 2 is a sectional view of the cross helical drive arrangement of the drive assembly shown in FIG. 1.

Referring to FIG. 1, there is shown a press wheel grain drill indicated generally at 10 having a main frame 12 supported for forward movement over the ground by ground engaging wheels 14 and 16. The drill is towed forwardly by a tractor (not shown) connected to forward hitch structure 18. Soil engaging tools 22 are mounted on the frame 12 and are movable to a ground engaging position, as shown in FIG. 1, for establishing transversely spaced furrows in the soil. Conventional seed tube and boot assemblies 24 are connected between the rear of each tool 22 and a corresponding metering structure 26 for delivering granular material from a hopper 28 to the furrow formed by the tool 22.

Figure 3:
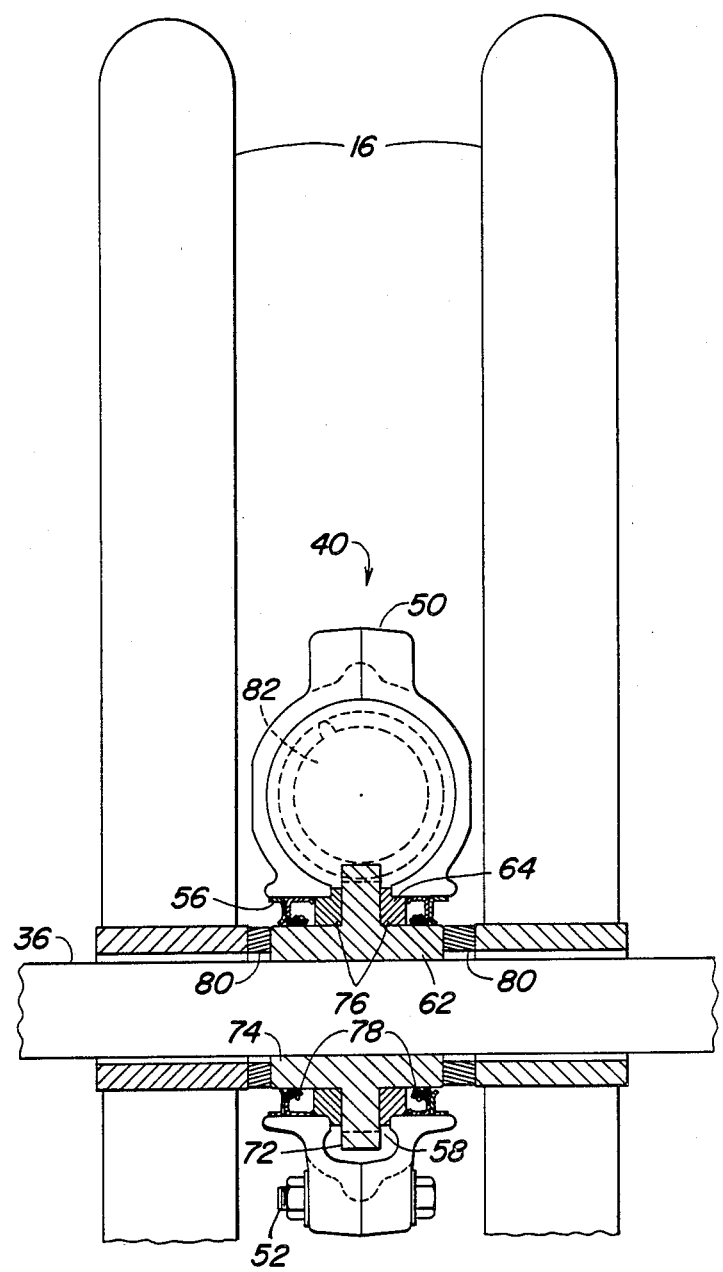
FIG. 3 is an enlarged rear view, partially broken away to show the location of the cross helical drive arrangement on the shaft of the press wheel assembly.

As shown in FIGS. 1 and 3, the wheels 16 are press wheels which are transversely spaced in press wheel gangs 32 with each press wheel 16 trailing a corresponding tool 22 to firm the soil over the material deposited in the furrow. Each press wheel gang 32 is rockably connected to the main frame 12 by pivot structure 34 to permit the gangs to rock over obstacles and to move with changing ground contours to provide uniform press wheel operation. As shown in FIG. 3, the press wheels 16 are relatively narrowly spaced on wheel gang axles or gang bolts 36. The press wheels are fixed to the axle 36 for rotation together, and a drive gear arrangement 40 is clamped to one of the axles 36 between a pair of the press wheels 16. The drive gear arrangement 40 is connected to a drive transmission 42, located at one side of the metering structure 26, by a flexible drive 44. Drive is therefore provided from the press wheels 16 through the drive gear arrangement 40, flexible drive 44 and drive transmission 42 to drive the metering structure 26 at a speed proportional to the ground speed of the implement 10.

The drive gear arrangement 40 includes a split housing or casing 50 secured together by bolts 52. The housing 50 includes a generally circular, open central portion 56 with an annular recess 58. A cross helical input gear 62 is journalled for rotation within the central portion 56 by bushing structure 64 which is seated in the annular recess 58. The gear 62 includes a hub 74 which extends outwardly in both directions from a central portion 76 which bears against the innermost surface of the bushing structure 64 and supports a housing thereupon. The bushing structure 64 thereby maintains both axial and transverse alignment of the gear 62 with respect to the housing 50. Two identical seals 78 are located axially outwardly from the bearing structure 64 and include seal lips which bear against the hub 74. The wheel gang axle 36 has a square cross section, and the hub 74 includes a bore generally conforming to the cross section of the axle to constrain the gear 62 for rotation together with the axle 36 and the corresponding press wheels 16. Spacers 80 are located on either side of the hub 74 to clamp and center the gear 62 and thus the drive gear arrangement 40 on the axle 36.

A second cross helical gear 82 is mounted directly above the gear 62 on a shaft 84 for rotation about an axis perpendicular to the axis of the axle 36. The gear 82 is welded to the end of the shaft 84, and the shaft 84 is rotatably mounted within a cylindrical housing 88 by a thrust bearing 92 located adjacent the aft end of the cylindrical housing 88, and by a second bearing 94 located inwardly adjacent the opposite end of the housing 88. The aft end of the housing 88 is retained within a cylindrical bore 96 located in the housing 50. A snap ring 98 is secured within grooves in the housing 50 and the aft end of the cylindrical housing 88 to lock the housing 88 with respect to the housing 50. The forward end of the cylindrical bore 96 is enlarged to receive an O-ring seal 102.

The gear 82 has teeth 106 which mesh with the teeth 72 of the input gear 62. As best seen in FIGS. 4–6, the gears 62 and 82 have relatively large teeth with each of the gears having a forty-five degree helix angle at the nominal pitch diameter. The gear 82 is substantially smaller than the gear 62 and permits use of a relatively narrow housing 50.

The forward end of the cylindrical housing 88 is threaded at location 108 to receive a connecting nut 112 located on the aft end of the flexible drive 44. The flexible drive 44 includes a flexible cable housing 114 which encloses a flexible wrapped wire cable 116. The end of the cable 116 includes a reduced sized end 118 having a drive member 120 of square cross section secured thereon. A corresponding bore 122 with square cross section is provided in the forward end of the shaft 84. The drive member 120 is inserted in the bore 122 and the connector 112 is threaded onto the end 108. The cable housing 114 includes an enlarged end 124 which is clamped between the connector 112 and the end of the cylindrical housing 88 as the connector is tightened onto the housing. Similar end connecting structure (not shown) is provided at the forward end of the flexible drive 44 for insertion into a drive member of the transmission 42.

The interior of the housing 50 is filled with lubricant and is sealed against dirt, mud and other environmental elements. The flexible drive 44 can be routed as necessary around obstructions on the frame 12. The press wheel gang 32 is free to rock without affecting the drive to the metering structure 26. Since the cross helical gears do not have to be held in close alignment, no adjustments have to be made. Only a small portion of the housing 50 projects below the axle 36. In the preferred embodiment as shown in FIG. 1, the cylindrical housing 88 projects upwardly and forwardly and is held loosely against rotation by a slotted bracket attached to the press wheel gang frame.

Having described the preferred embodiment, it will be apparent that modifications can be made without departing from the scope of the invention as defined in the accompanying claims.

I claim:

1. A seeding implement adapted for forward movement including the combination of a rockable press wheel gang having a plurality of press wheels mounted for rotation on an axle and a drive means for driving a metering structure from the press wheel gang, said drive means comprising:

a gear housing, a first cross helical gear supported in the housing, means for mounting the first gear on the axle between adjacent press wheels, a second cross helical gear meshing with the first gear and supported in the housing above the first gear, a flexible drive cable including a first end operably connected to the second gear and a second end operably connected to the metering structure, a flexible cable housing enclosing the cable, and wherein the first gear is clamped on the axle and supports the housing at a preselected location on the axle.

2. The invention as set forth in claim 1 wherein the second gear is supported for rotation about an axis transverse to the axle.

3. The invention as set forth in claim 1 including spacer means mounted on the axle and clamping the first gear at the preselected axle location.

4. The invention as set forth in claim 1 wherein the first gear includes a hub, and further including means for sealing the interior of the gear housing against the environment, said means for sealing including a seal bearing against the gear hub.

5. The invention as set forth in claim 4 wherein the first gear includes a hub having a transverse dimension spanning a substantial portion of the axle between two adjacent press wheels, and spacer means located on the axle between said adjacent press wheels generally encompassing the remaining portion of the axle not spanned by the hub between said adjacent press wheels for axially maintaining the first gear.

6. The invention as set forth in claim 5 wherein the housing is supported on the axle with a substantially greater portion of the housing located above the axle than below the axle.

7. The invention as set forth in claim 1 including a cylindrical housing member projecting upwardly from the gear housing and including a drive shaft contained within the cylindrical housing member and operably connected to the drive cable.

8. The invention as set forth in claim 1 wherein the housing projects upwardly and forwardly from the axle, and means for holding the housing loosely against rotation about the axle.

9. The invention as set forth in claim 1 wherein the gears have tooth angles of forty-five degrees.

* * * * *